US008718404B2

(12) United States Patent
Chupeau et al.

(10) Patent No.: US 8,718,404 B2
(45) Date of Patent: May 6, 2014

(54) METHOD FOR TWO-STEP TEMPORAL VIDEO REGISTRATION

(75) Inventors: Bertrand Chupeau, Rennes (FR); Frédéric Lefebvre, Rennes (FR); Severine Baudry, Rennes (FR)

(73) Assignee: Thomson Licensing, Issy les Moulineaux (FR)

( * ) Notice: Subject to any disclaimer, the term of this patent is extended or adjusted under 35 U.S.C. 154(b) by 157 days.

(21) Appl. No.: 13/138,296

(22) PCT Filed: Feb. 5, 2010

(86) PCT No.: PCT/EP2010/051448
§ 371 (c)(1),
(2), (4) Date: Jul. 28, 2011

(87) PCT Pub. No.: WO2010/089384
PCT Pub. Date: Aug. 12, 2010

(65) Prior Publication Data
US 2011/0311135 A1    Dec. 22, 2011

(30) Foreign Application Priority Data
Feb. 6, 2009 (EP) .................................... 09305112

(51) Int. Cl.
*G06K 9/00*  (2006.01)
*G06K 9/32*  (2006.01)

(52) U.S. Cl.
USPC .......................... 382/294; 382/100; 382/168

(58) Field of Classification Search
USPC ......... 382/278, 236, 238, 239, 232, 107, 165, 382/218, 294; 348/180, 412.1, 413.1, 348/414.1, 415.1, 416.1, 417.1, 418.1, 348/422.1, 429.1, 427.1, 430.1
See application file for complete search history.

(56) References Cited

U.S. PATENT DOCUMENTS

| | | | | |
|---|---|---|---|---|
| 6,751,354 B2 * | 6/2004 | Foote et al. | .................... | 382/224 |
| 6,751,360 B1 * | 6/2004 | Lu | ................... | 382/278 |
| 7,705,881 B2 * | 4/2010 | Okamoto et al. | ............. | 348/180 |
| 7,747,103 B2 * | 6/2010 | Iizuka | ............................ | 382/278 |
| 8,370,869 B2 * | 2/2013 | Paek et al. | ........................ | 725/19 |
| 2007/0245242 A1 * | 10/2007 | Yagnik | .......................... | 715/721 |

(Continued)

FOREIGN PATENT DOCUMENTS

WO    WO2007080133    7/2007

OTHER PUBLICATIONS

Chupeau et al, Automatic Estimation and Compensation of Geometric Distortions in Video CopiesVisual Communications and Image Processing 2007, edited by Chang Wen Chen, Dan Schonfeld, Jiebo Luo, Proc. of SPIE—IS&T Electronic Imaging, SPIE vol. 6508.*

(Continued)

*Primary Examiner* — Andrae S Allison
(74) *Attorney, Agent, or Firm* — Tutunjian & Bitetto, P.C.

(57) ABSTRACT

The invention relates to a method for temporal video registration of a target video with a master video comprising steps of automatic selection a plurality of key frames for target video and a plurality of key frames for master video; sparse registration of a plurality of key frames for target video with a plurality of key frames for master video; dense registration of frames of target video with frames of master video belonging to a temporal segment including registered key frames.

5 Claims, 4 Drawing Sheets

(56) References Cited

U.S. PATENT DOCUMENTS

| | | | | |
|---|---|---|---|---|
| 2008/0253689 | A1* | 10/2008 | Ferguson | 382/294 |
| 2009/0263014 | A1* | 10/2009 | Zhang et al. | 382/165 |
| 2010/0225767 | A1* | 9/2010 | Ferguson | 348/180 |
| 2010/0303340 | A1* | 12/2010 | Abraham et al. | 382/154 |

OTHER PUBLICATIONS

Chupeau, B.; Oisel, L.; Jouet, P., "Temporal Video Registration for Watermark Detection," Acoustics, Speech and Signal Processing, 2006. ICASSP 2006 Proceedings. 2006 IEEE International Conference on , vol. 2, No., pp. II,II, May 14-19, 2006.*

Chih-Chung Hsu; Tzu-Yi Hung; Lin, Chia-Wen; Chiou-Ting Hsu, "Video forgery detection using correlation of noise residue," Multimedia Signal Processing, 2008 IEEE 10th Workshop on , vol., No., pp. 170,174, Oct. 8-10, 2008.*

Chupeau et al., "Temporal Video Registration for Watermark Detection", Acoustics, Speech and Signal Processing, 2006, ICASSP 2006 Proceedings, Toulose, France, May 14-19, 2006, p. II.

Baudry et al., "A Framework for Video Forensics Based on Local and Temporal Fingerprints", Image Processing (ICIP), 2009, 16th IEEE International Conference, Nov. 7, 2009, pp. 289-2892.

Chupeau et al., "Automatic Estimation and Compensation of Geometric Distortions in Video Copies", Visual Communications and Image Processing, San Jose, Jan. 30, 2007.

Singh et al., "Content-Based Matching of Videos Using Local Spatio-Temporal Fingerprints", Computer Vision A ACCV 2007, Heidelberg, Berlin, Nov. 18, 2007, pp. 414-423.

Massoudi et al., "A Vieo Fingerprint Based on Visual Digest and Local Fingerprints", Image Processing, 2006 IEEE International Conference, ICIP 2006, Oct. 1, 2006, pp. 2297-2300.

Lefebvre et al., "Image and Video Fingerprinting: Forensic Applications", Proceedings of the International Society for Optical Engineering (SPIE), vol. 7254, Jan. 19, 2009, pp. 725405-1.

Ren et al., "Video Sequqence Matching with Spatio-Temporal Constraints", Pattern Recognition, 2004, ICPR 2004, Proceedings of the 17th International Conference on Cambridge, UK, vol. 3, Aug. 23-26, 2004, pp. 834-837.

Search Report Dated Aug. 2, 2010.

* cited by examiner

METHOD FOR TWO-STEP TEMPORAL VIDEO REGISTRATION

This application claims the benefit, under 35 U.S.C. §365 of International Application PCT/EP2010/051448, filed Feb. 5, 2010, which was published in accordance with PCT Article 21(2) on Aug. 12, 2010 in English and which claims the benefit of European patent application No. 09305112.6, filed Feb. 6, 2009.

FIELD OF THE INVENTION

The invention relates to a method for temporal video registration. More particularly the invention relates to a method for temporal registration of a target video with a master video using fingerprints.

BACKGROUND OF THE INVENTION

Temporal video registration consists in temporally aligning frames of two videos (or of segment of videos) of a same content.

Temporal registration has applications in the domain of video forensics, such as registering a pirated copy video with a master video in order to enable or enhance a watermark decoding. In the domain of video home editing, temporal registration of video segments from different recordings of the same event (possibly using different sensors such as camcorder, mobile phone, PDA, digital still camera, etc.) allows combination of such video segments into one video stream. This problem is solved in a professional context (TV, cinema), either by physically connecting capture devices ("jam sync") or by using "claps". But there is no such solution in the consumer domain (home videos of parties, concerts, weddings, vacations . . . ). Temporal registration may also be used in other multi-sensor video environment such as visible and infra-red. While in the domain of time super resolution, a temporal matching of multiple unsynchronized videos with low frame-rate into a single video with higher frame-rate is performed.

A common technique to achieve this registration is based on the registration of temporal video fingerprints. The "fingerprint" of a video content is a set of features—automatically extracted from the video signal—which are compact, discriminant and robust to signal distortions. A temporal fingerprint is a particular kind of fingerprint capturing the evolution of the signal over time. However, computing and aligning temporal fingerprints of a target and a master video is time and power consuming for a whole content, while in many cases only a temporal segment of such video is interesting (such as in video forensics, the temporal segment with the embedded watermark). Thus known method such as direct frame wise alignment of entire long videos is not possible and subject to high probability of errors, while alignment of segments within a long video raises the issue of localizing such segments in the longer video. In the state of the art, this localization is visually done by an operator.

A method for automatic temporal registration of long video or segments of long video is needed.

SUMMARY OF THE INVENTION

To this end, the invention relates to a method for temporal video registration of a target video with a master video using key frames extracted from each video used as anchoring points in a preliminary coarse alignment. In a further step, known methods for frame wise temporal registration around aligned anchoring points are processed on segments of video, thus advantageously allowing focus on segment of interest in the video, reducing computation power and reducing computation time by a possible parallel processing. These key frames are representative frames of the shots of a video content and chosen for their repeatability and their robustness to distortion. According to the invention, key frames are automatically extracted at a minimum of temporal activity within a shot; thus being stable, having advantageously a high probability of being detected at the same location even after signal distortions (compression, frame rate conversions, etc.).

In a first preferred embodiment, the invention relates to a method for temporal video registration of a target video with a master video comprising a step of automatic selection of a plurality of key frames for the target video and a plurality of key frames for master video; a step of a sparse registration of a plurality of key frames for the target video with a plurality of key frames for the master video; and a step of a dense registration of frames of the target video with frames of the master video belonging to a temporal segment including registered key frames. This last step being initialized by the sparse alignment of the key frames belonging to the segment of interest. As aforesaid, this two step registering process is particularly well adapted to long lasting video as well as registration of temporal segment of video.

In a second preferred embodiment, the step of sparse registration further comprises a step of computing a fingerprint for each frame of a plurality of selected key frames for the target video and a fingerprint for each frame of a plurality of selected key frames for the master video; a step of matching key frames for the target video with key frames for the master video, where the matching minimizes the distance between fingerprint for the target video and fingerprint for the master video; and thus obtaining a plurality of L matched key frame pairs comprising a key frame belonging to the target video aligned with a key frame belonging to the master video.

In a third preferred embodiment, the step of dense registration further comprises a step of selecting a temporal segment of interest for the target video or the master video; a step of identifying key frames pairs among the plurality of L matched key frame pairs belonging to the temporal segment of interest; a step of extracting for each frame of the master video belonging to a temporal segment including the identified matched key frames, a temporal fingerprint value for the master video; a step of extracting for each frame of the target video belonging to a temporal segment including the identified matched key frames, a temporal fingerprint value for the target video; a step of matching frames of the target video with frames of the master video, where the matching minimizes the distance between temporal fingerprint for target video and temporal fingerprint for master video; thus obtaining a plurality of matched frame pairs belonging to target video and to master video.

This video alignment combining a coarse and fine alignment, proved robust to frame rate changes, frames dropping, scene removal and other non linear temporal distortion. Thus, no parametric temporal distortion model, such as an affine transform modeling a time shift and a frame rate conversion, is assumed between the two videos. The frame-to-frame correspondence as obtained after the fine temporal registration, models any non-linear transform.

In a third embodiment, the step of selecting key frames comprises selecting frames according to criteria such as minimization of the temporal variation of a frame based global fingerprint, minimization of an estimated movement vector field activity, localization regarding shot boundaries, median value of the color histogram computed for the entire shot.

This list is not exhaustive and other criteria can be imagined based on different kind of histograms, for instance computed on luminance, or high level method based on the numbers of subjects, for instance characters, present in a frame. The selection of key frames according a preferred embodiment extracts frames for each shot of the video, temporally stable in terms of minimum of temporal activity. This key frames selection process does not guarantee exact frame accuracy during the step of key frames matching, as the key frame may not be detected at exactly the same location in a distorted version of the video: possible small drift of a few frames can be observed. However theses stable frames are robust enough to frame rate changes, frames dropping, compression artifacts, etc., providing reliable anchor points in a shot apart from the possible drift.

In a fourth embodiment, the step of computing for each selected key frames, a fingerprint for the target video and a fingerprint for the master video comprises computing a fingerprint chosen among a frame based global fingerprint and a key point based local fingerprint. These two embodiments advantageously offer fingerprints for the best tradeoff between computational power and distortion level of the target video.

BRIEF DESCRIPTION OF THE DRAWINGS

Other characteristics and advantages of the invention will appear through the description of a non-limiting embodiment of the invention, which will be illustrated, with the help of the enclosed drawing.

DETAILED DESCRIPTION OF PREFERRED EMBODIMENTS

Figure 1:
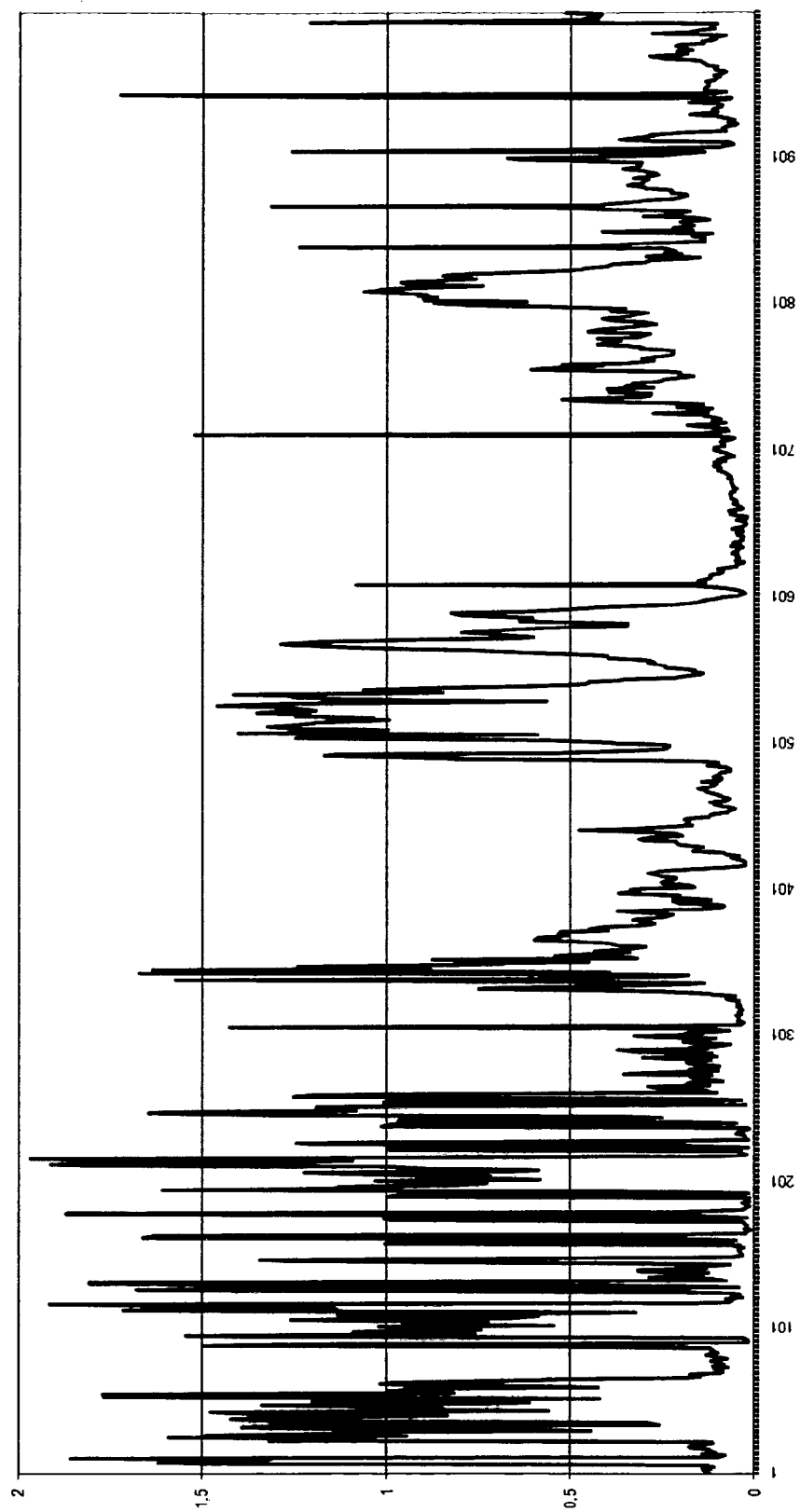
FIG. 1 represents an example of temporal fingerprint.

The following definitions will be used in the description of the invention.

DEFINITIONS

Fingerprint: a "condensate" computed on multimedia data (e.g. on a picture, or video). The fingerprint size is much smaller than the multimedia data.

Spatial fingerprint: a fingerprint computed on a single image.

Global fingerprint: a spatial fingerprint, globally characterizing an image.

Local fingerprint: a spatial fingerprint. It is a set of vectors $\{V[x_1,y_1], V[x_2,y_2] \ldots V[x_n,y_n]\}$. Each couple $(x_i,y_i)$ is the location of a salient point of the image (eg edge). $V[x_i,y_i]$ locally characterize the image around pixel $x_i,y_i$.

FG[i]: global fingerprint computed on frame i of a video.

FL[i, $x_j$, $y_j$]: local fingerprint computed on frame i of a video and on salient point $x_j,y_j$.

Temporal fingerprint: a fingerprint computed on a whole video. A temporal fingerprint is an array, each element of the array (scalar or vector) is characteristic of an image.

FT[i]: value of temporal fingerprint for frame i.

FP: union of temporal, spatial local and spatial global: FP={FT, FL, FG}

Vc: target video

Vm: master video

Vr: registered video

T( ): transform (here temporal but may be spatial, luminance/color . . . )

Registration: transformation of the target video to produce a registered video, which is aligned with the master video. The transformation can be spatial, temporal, luminance/color . . . . If Vc=T(Vm), then ideally: $Vr=T^{-1}(Vc)=Vm$.

A video fingerprinting scheme based on two fundamental analysis bricks is developed. The first one captures the global texture properties of an image from a set of radial projections. The second one locally describes the texture characteristics around keypoints. In addition the list of distances between global feature vectors of successive frames captures the temporal evolution of the video. Shot boundaries are easily extracted from this signal, as well as a key frame per shot. The local description around extracted keypoints is then computed on each key frame.

The complete video fingerprint therefore consists of three parts: (i) a global feature vector for each key frame, (ii) a set of key point positions and their local feature vector for each key frame, and (iii) a frame wise one-dimensional temporal signal. They are described in details in the two following paragraphs.

Key Frame-Based Global Fingerprint

The so-called "RASH" (standing for Radial hASHing algorithm) description, was originally presented in the document of C. De Roover, C. De Vleeschouwer, F. Lefèbvre, and B. Macq, "Robust video hashing based on radial projections of key frames", *IEEE Trans. on Signal Processing*, vol. 53, no. 10, pp. 4020-4037, October 2005.

It is used to capture the global texture properties of an image. Each RASH element is the variance of the pixels belonging to a line passing through the image center: a 1° discretization gives a 180-dimension vector.

This global image description also proves very useful to recover the temporal structure of the video. For that purpose the distance between the RASHes of successive frames is computed: abrupt variations of this signal are deemed to correspond to shot boundaries. An automatic thresholding process based on two (global and locally adaptive) thresholds, is detailed in the above mentioned document. The frame with minimal RASH-distance variation within a shot is a criterion of selection of the representative frame for this video segment, named key frame. An average of 7 such "stable frames" is extracted per minute on a typical master video content. The "global fingerprint" is then the concatenation of the RASH fingerprints of the key frames for this content.

And the framewise sequence of distances between successive RASHes, used to detect shot boundaries and representative frames, is saved as an additional "temporal fingerprint" for the video (depicted in FIG. 1 for a 30 second long segment of a master content).

Keypoint-Based Local Fingerprint

The global image description is compact and fast to compute but is not robust to usual geometrical distortions such as cropping. For that reason, it is complemented with a local description of texture characteristics around keypoints. This is described in document from A. Massoudi, F. Lefèbvre, C.-H. Demarty, L. Oisel, and B. Chupeau, "A video fingerprint based on visual digest and local fingerprint", *Proc. of IEEE Int. Conf. on Image Processing*, pp. 2297-2300, Atlanta, Ga., USA, October 2006.

The keypoint detection is performed by extracting the extrema in high-pass difference of Gaussian images (DOG), at different scales. An average of 500 keypoints is detected on a typical standard definition keyframe (720×576 pixels). The description around each detected keypoint captures the distribution of gradient orientations in a circular neighborhood. More precisely, nine sectors are defined, relatively to the local orientation. The descriptor is then the concatenation of 16-bin histograms of the gradient orientations in those nine regions. The "local fingerprint" of the video is then the concatenation of keypoint fingerprints from each representative frame.

Key Frame Selection

Video is automatically split into shots and key frames are extracted for each shot. Shot boundaries or cuts, corresponding to a change in video content, are easily detected by the observation of temporal activity of the video, for instance represented by a temporal fingerprint. As aforesaid in a preferred embodiment for computing a temporal fingerprint, abrupt variations of the distance between the RASHes of successive frames are deemed to correspond to shot boundaries. Shot boundaries correspond to peaks in the temporal fingerprint represented on FIG. 1. Then one or more frames per shots are chosen for each shot of the whole video. A criterion of selection is the minimum of temporal activity represented on FIG. 1. As aforesaid, "stable" key frames are extracted for each shot by using the property of the sequence of differences between successive global fingerprints. An average of 7 such "stable frames" is extracted per minute on a typical master video content. In a variant, stable frame are computed using movement vector of key point in the frame.

In a preferred embodiment, frames close to shot boundaries in term of temporal distance, are also chosen as key frame and completes the first set of representative frames.

However many others criteria such as frame in the middle of shot boundaries in term of temporal distance, frame with an attribute value (such as color histogram, luminance histogram . . . ) closest to the same attribute average value computed on the shot.

Temporal Registration

Once the key frames have been extracted from both target and master video, and once global fingerprints FGC FGM, or according to a variant local key point fingerprints FLC FLM, have been computed for key frames, a two pass method for temporal alignment of both videos is performed.

Figure 2:
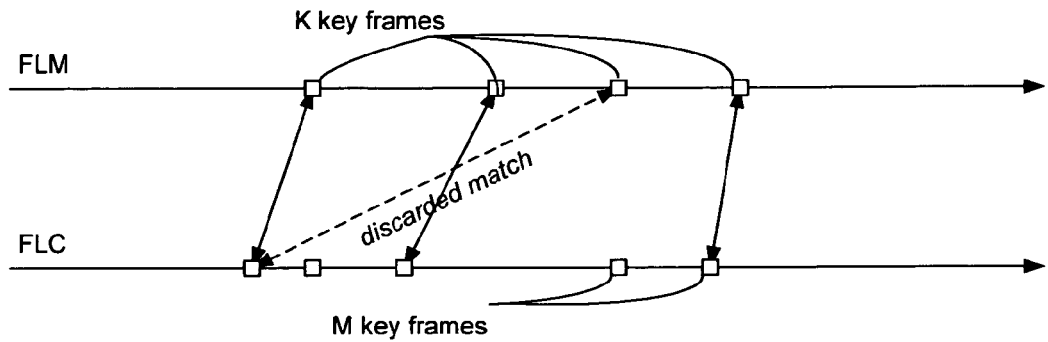
FIG. 2 represents key frames mapping in sparse temporal registration.

A coarse key frame matching, as represented FIG. 2 is achieved using fingerprints. The key frame matching minimizes the distance between fingerprint FLC of key frames m of the target video and fingerprint FLM of key frames k of the master video. In a preferred embodiment, unreliable key frames matches regarding temporal consistency are discarded. Pairs of matched key frames belonging both target and master video advantageously provide loose anchor key points for a fine temporal registration as well as for temporal localization in both video.

Figure 3:
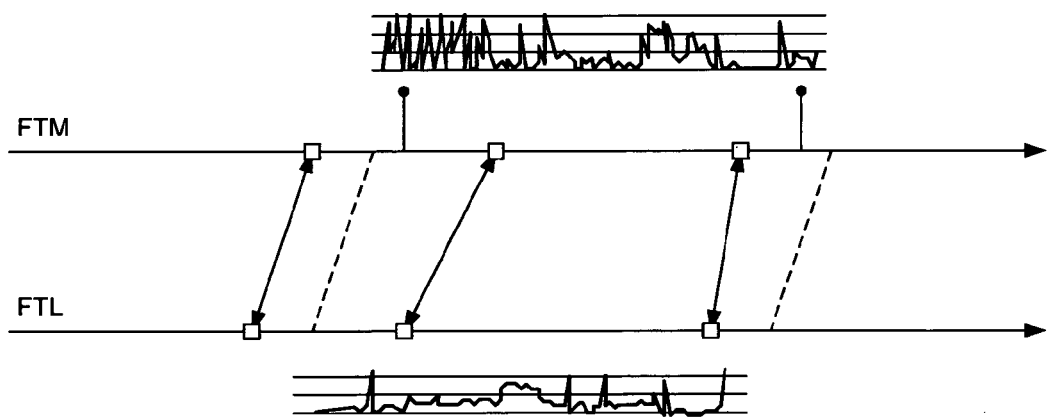
FIG. 3 represents frame wise mapping in dense registration on a temporal segment of video.

Once the key frames of the target video have been matched with key frames of the master video, a fine temporal alignment on a frame-to-frame basis can be achieved using temporal fingerprints. In a preferred embodiment this fine temporal alignment is not performed on the whole video but on temporal segment of interest chosen in either the target or the master video. Thanks to coarse registration, the localization of the corresponding segment in the dual video is possible as represented on FIG. 3. Thus a temporal segment of interest is selected in the master video. Key frames included in the temporal segment of interest are identified in the master video. Corresponding matched key frames in the target video are identified using pairs of matched key frames from the sparse registration. A temporal segment, including matched key frames of the target video is therefore identified in the target video. The dense registration is initialized using temporal fingerprint FTC FTM belonging to the selected segment.

Figure 4:
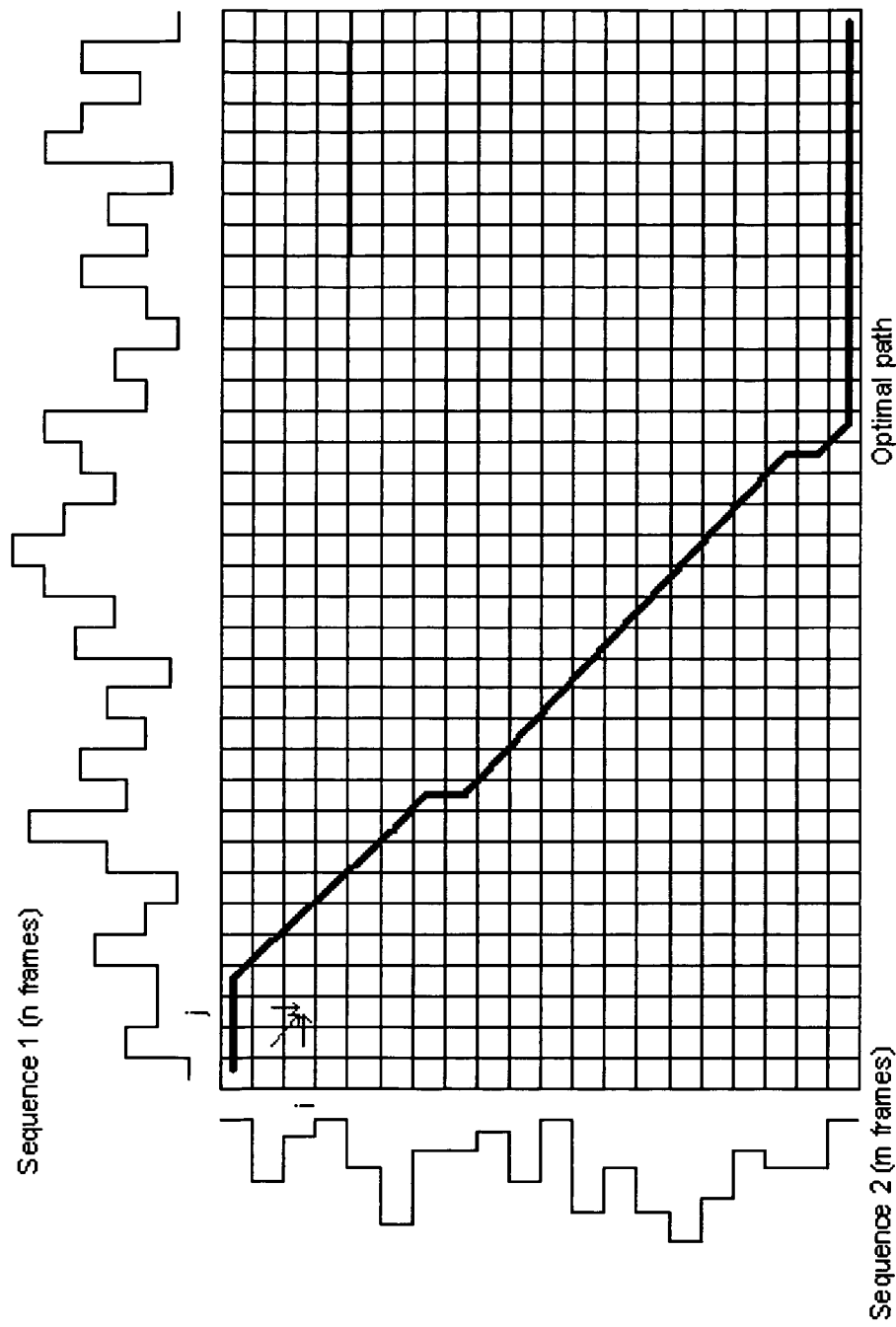
FIG. 4 represents a sequence alignment by dynamic time warping.

In the document from B. Chupeau, L. Oisel and P. Jouet "Temporal video registration for watermark detection", *Proceedings of IEEE International Conference on Acoustics, Speech and Signal Processing*, vol. 2, pp. 157-160, May 2006 a method for frame-to-frame alignment based on dynamic time warping, taking as input two such one-dimensional temporal fingerprints is described. In FIG. 4, an example of optimal frame-matching path found by the dynamic time warping algorithm is depicted.

On the horizontal axis i, each frame of the master video is represented. On the vertical axis j, each frame of the target video is represented. Each frame i or respectively j is represented by its temporal fingerprint value FTM[i] or respectively FTC[j] computed as indicated previously.

Each cell A(i,j) of the array gives the minimal distance between two sequences to pair a frame i of the master video with a frame j of the target video. The minimal distance between fingerprint FTC and FTM is computed as being the sum of:
 the distance between the temporal fingerprint value FTC[i], FTM[j] associated with each frame,
 the minimal distance path to arrive at the cell A(i,j).
 This gives the following equation:

$$A(i,j)=\text{Min}(A(i-1,j-1),wh*A(i,j-1),wv*A(i-1,j))+\text{dist}((i,j)).$$

Here wh and wv are penalties associated with the horizontal and vertical transitions. The horizontal and vertical transitions correspond to the respective mapping of a frame of the target video with several frames of the master video and a frame of the master video with several frames of the target video. The values of wh and wv are preferably greater than 1 in order to penalize these transitions compared to the oblique transitions.

The distance dist(i,j) between the temporal fingerprint of the two frames is preferably computed as follows (so-called "$\chi^2$" distance):

$$\text{dist}(i,\,j) = \frac{(FTM[i] - FTC[j])*(FTM[i] - FTC[j])}{(FTM[i] + FTC[j])}$$

With FTM[i] and FTC[j] respectively representing the temporal fingerprint of the frame i of the first video and of the frame j of the second video.

This video alignment process proved robust to frame-rate changes, frame dropping, scene removal, and other non-linear temporal distortions. Besides this video alignment process is adapted to long video sequence or segment of video sequence.

Figure 5:
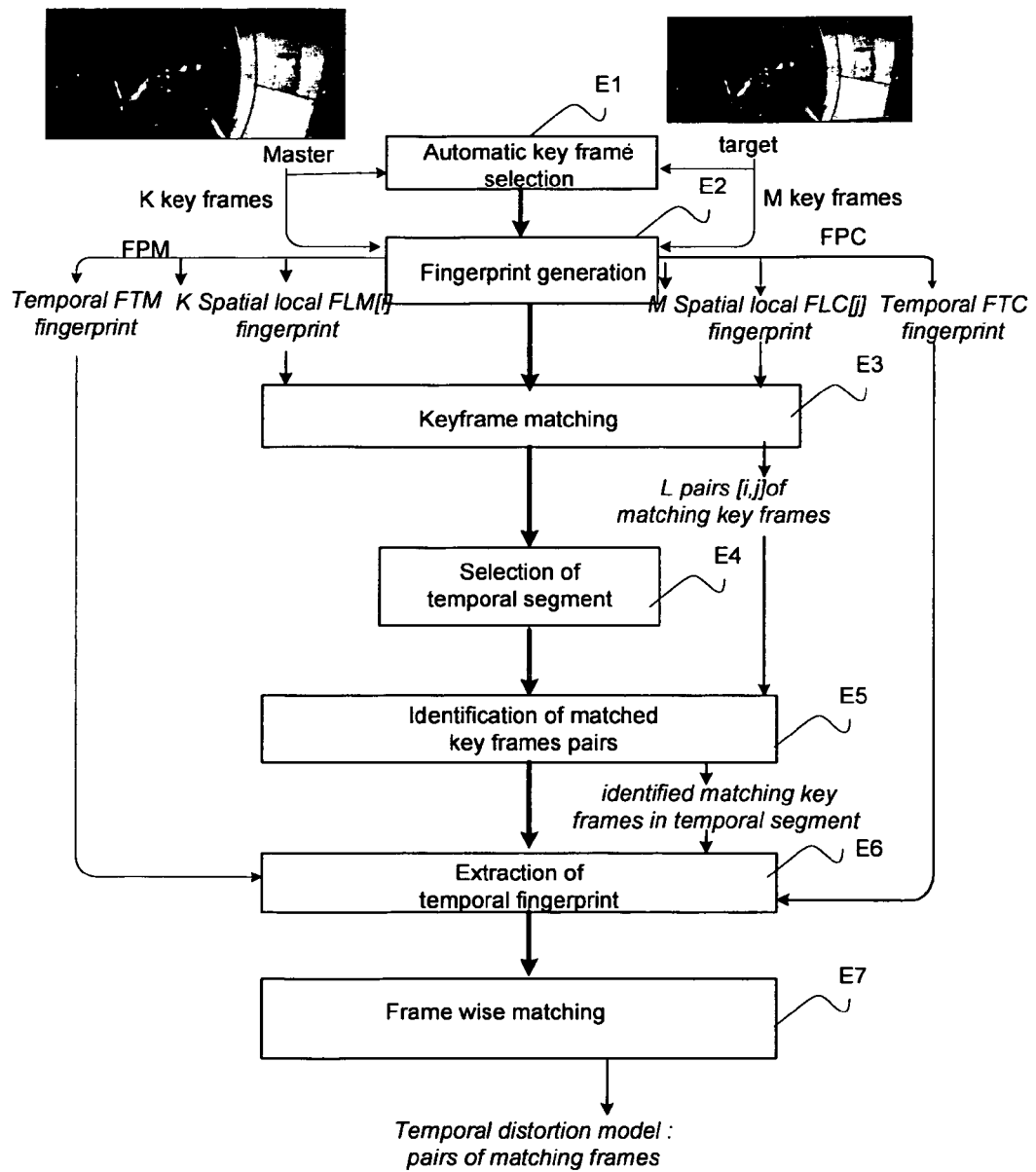
FIG. 5 represents a preferred embodiment of the invention.

The following detailed description of a preferred embodiment of the invention refers to FIG. 5.

In a step E1, key frame selection is performed using minimum of temporal activity and distance to shot boundaries.

In a step E2, fingerprints are computed for master and target videos based on key frame. Fingerprint extraction is for instance described in documents from A. Massoudi, F. Lefèbvre, C.-H. Demarty, L. Oisel, and B. Chupeau, "A video fingerprint based on visual digest and local fingerprint", *Proc. of IEEE Int. Conf. on Image Processing*, pp. 2297-2300, Atlanta, Ga., USA, October 2006, and B. Chupeau, L. Oisel and P. Jouet "Temporal video registration for watermark detection", *Proceedings of IEEE International Conference on Acoustics, Speech and Signal Processing*, vol. 2, pp. 157-160

The extracted master fingerprint FPM for master video comprises:
- A list of K key-frame indices,
- A list of K local fingerprints FLM[i] made, for each key-frame i, of a list of key-point coordinates $(x_j, y_j)$ with associated local feature vectors: FL[i, $x_j, y_j$],
- A temporal fingerprint: signal describing the temporal evolution (frame-based) of the video FTM.

The extracted video fingerprint FPC the target video comprises:
- A list of M key-frame indices,
- A list of M local fingerprints FLC[j] associated to each key-frame j,
- A temporal fingerprint FTC.

In a step E3 a sparse key frame matching is processed. A subset of L (L≤M and L≤K) matched (target, master) key-frame pairs belonging to target and master video defined a sparse temporal registration model.

In a step E4, a temporal segment of interest in the master video or the target is designated. For instance in the forensic field, it is a segment of the video were a watermark has been embedded, and for which we need registration to be able to read the watermark.

In a step E5, matched key frame pairs belonging to temporal segment of interest are then identified. These key frames belonging to either master or target video provide initialization for fine temporal registration on segment of interest corresponding in both video.

In a step E6, a temporal fingerprint is extracted, describing the temporal evolution on frame basis of the master video FTM[i], respectively the target video FTC[j] in the temporal segment of interest.

In a step E7, a dense, i.e. frame wise temporal registration is performed. A frame-accurate temporal registration is obtained by finding the frame-to-frame mapping minimizing the distance between the temporal fingerprints of the candidate video FTC and of the master video FTM for example using dynamic time warping.

The invention is also novel in the sequence of operations in the system. This sequence is such that processing time is minimized by still enabling accurate parameters estimation. This first coarse temporal estimation (step E3) is further refined by fine temporal registration (step E7). The combination of these 2 steps enables fast and efficient registration even when the video is heavily transformed. A process using only frame wise registration (step E7) would be very computationally expensive, or would lead to misregistration if the video has undergone significant modifications.

The invention claimed is:

1. A method for temporal video registration of a target video with a master video wherein it comprises steps of:
   - automatic selection of a plurality of key frames for said target video and a plurality of key frames for master video;
   - sparse temporal registration of a plurality of key frames for said target video with a plurality of key frames for master video; and
   - dense temporal registration of frames of said target video with frames of said master video belonging to a temporal segment including a subset of registered key frames.

2. The method according to claim 1, wherein the step of sparse temporal registration further comprises steps of:
   - computing for each frame of the plurality of selected key frames for said target video, a fingerprint and for each frame of the plurality of selected key frames for said master video, a fingerprint;
   - matching key frames for said target video with key frames for said master video, where the matching minimizes the distance between fingerprint for said target video and fingerprint for said master video; and
   - obtaining a plurality of L matched key frame pairs comprising a key frame belonging to said target video and a key frame belonging to said master video.

3. The method according to claim 2, wherein the step of dense temporal registration further comprises steps of:
   - selecting a temporal segment of interest for said target video or said master video;
   - identifying key frames pairs among said plurality of L matched key frame pairs belonging to said temporal segment of interest;
   - extracting for each frame of said master video belonging to a temporal segment including the identified matched key frames, a temporal fingerprint value for said master video;
   - extracting for each frame of said target video belonging to a temporal segment including the identified matched key frames, a temporal fingerprint value for said target video;
   - matching frames of said target video with frames of said master video, where the matching minimizes the distance between temporal fingerprint for said target video and temporal fingerprint for said master video; and
   - obtaining a plurality of matched frame pairs belonging to said target video and to said master video.

4. The method according to claim 1, wherein the step of automatic selection of key frames comprises selecting frames according to one of the following criteria:
   - minimization of the temporal variation of a frame based global fingerprint,
   - minimization of an estimated movement vector field activity,
   - localization relative to shot boundaries, and
   - median value of the color histogram computed for the entire shot.

5. The method according to claim 2 wherein the step of computing for each selected key frames, a fingerprint for said target video and a fingerprint for said master video comprises computing a fingerprint chosen among a frame based global fingerprint and a key point based local fingerprint.

* * * * *